(12) United States Patent
Malavasi

(10) Patent No.: US 10,648,588 B2
(45) Date of Patent: May 12, 2020

(54) ENERGY RECOVERING FLOW CONTROL VALVES

(71) Applicant: POLITECNICO DI MILANO, Milan (IT)

(72) Inventor: Stefano Malavasi, Buccinasco (IT)

(73) Assignee: Politecnico Di Milano, Milan, (MI) (IT)

(*) Notice: Subject to any disclaimer, the term of this patent is extended or adjusted under 35 U.S.C. 154(b) by 245 days.

(21) Appl. No.: 15/560,071

(22) PCT Filed: Mar. 30, 2016

(86) PCT No.: PCT/IB2016/051782
§ 371 (c)(1),
(2) Date: Sep. 20, 2017

(87) PCT Pub. No.: WO2016/157085
PCT Pub. Date: Oct. 6, 2016

(65) Prior Publication Data
US 2018/0080576 A1    Mar. 22, 2018

(30) Foreign Application Priority Data

Mar. 30, 2015  (IT) .................. 102015000010298

(51) Int. Cl.
*F16K 47/08*     (2006.01)
*F01D 17/14*     (2006.01)
(Continued)

(52) U.S. Cl.
CPC ............ *F16K 47/08* (2013.01); *F01D 17/145* (2013.01); *F16K 1/12* (2013.01); *F01D 1/04* (2013.01);
(Continued)

(58) Field of Classification Search
CPC . F16K 47/08; F16K 1/12; F16K 31/50; F01D 17/145; F01D 1/04; F01D 1/06; F05D 2260/4031; F05D 2260/404
(Continued)

(56) References Cited

U.S. PATENT DOCUMENTS

| 4,022,423 A * | 5/1977 | O'Connor | F16K 47/00 251/127 |
| 9,010,371 B2 * | 4/2015 | Folk | F16K 25/005 137/625.33 |
| 2008/0029722 A1 * | 2/2008 | Irwin | F16K 31/402 251/45 |

FOREIGN PATENT DOCUMENTS

| DE | 10 2010 005459 A1 | 7/2011 |
| WO | 2013-121375 A1 | 8/2013 |
| WO | 2014-132187 A2 | 9/2014 |

OTHER PUBLICATIONS

International Search Report and Written Opinion dated Jul. 1, 2016, issued in PCT/IB2016/051782, filed Mar. 30, 2016.

* cited by examiner

*Primary Examiner* — Aaron R Eastman
(74) *Attorney, Agent, or Firm* — Workman Nydegger

(57) ABSTRACT

A control valve for a fluid flow includes: a valve body that defines an inlet and an outlet for the fluid, an obstructer inserted in the valve body, and an actuator system configured for reversibly translating the obstructer between a first position, in which the obstructer allows the passage of the fluid between the inlet and the outlet, and a second position, in which the obstructer prevents the passage of the fluid between the inlet and the outlet; the control valve further includes a turbine rotor housed inside the valve body, wherein the rotor includes a plurality of blades and is configured for continuously rotating under the action of the (Continued)

fluid flowing between the inlet and the outlet, the rotor rotating about an axis of rotation substantially aligned with the direction of translation of the obstructer.

16 Claims, 6 Drawing Sheets

(51) Int. Cl.
*F16K 1/12* (2006.01)
*F01D 1/04* (2006.01)
*F01D 1/06* (2006.01)
*F16K 31/50* (2006.01)

(52) U.S. Cl.
CPC .......... *F01D 1/06* (2013.01); *F05D 2260/404* (2013.01); *F05D 2260/4031* (2013.01); *F16K 31/50* (2013.01)

(58) Field of Classification Search
USPC .................................. 415/124.1; 251/127, 45
See application file for complete search history.

ENERGY RECOVERING FLOW CONTROL VALVES

BACKGROUND OF THE INVENTION

Field of the Invention

The present invention relates to fluid flow control valves, in particular control valves that allow recovering a part of the energy of the fluid flowing through the valve itself.

The Relevant Technology

Devices are known which can control the flow of a fluid through a duct, which are called "valves". Valves are typically used as on/off and adjustment devices in ducts for liquids, in particular liquids under pressure. Valves allow the duct with which they are associated to be selectively closed, so as to prevent a fluid, such as gas, liquid, steam, or a two-phase fluid, from flowing therein.

Among the various types of valves known in the art, there are control valves called "globe" valves and control valves called "plunger" valves.

"Globe" control valves comprise a valve body and an obstructer inserted therein, which can translate within the valve body to reach a position in which it obstructs the passage of fluid from an inlet chamber. The obstructer of globe valves may have a disc-like shape or other similar shapes.

"Plunger" valves comprise a valve body and, internally, a plunger-like or ovoid element. Different types of "plunger" valves exist. In some types, the plunger-shaped element acts as an obstructer by translating within the valve body in order to close a nozzle.

Other types include a specific obstructer, which translates within the valve body; said obstructer is adapted to mate, in various configurations, with the plunger-shaped or ovoid element, and is further adapted to occlude an outflow section of the valve in order to stop the fluid flow.

"Globe" and "plunger" valves are mostly used for adjusting the fluid flow rate in a duct along which the valve is inserted. This flow rate adjustment is made by having the obstructer translate into a position of incomplete obstruction, thus causing load losses at the obstructer which reduce the fluid flow without however completely preventing it.

Of course, the "globe" and "plunger" valves known in the art also allow the duct to be completely closed, in positions in which the obstructer will totally prevent any flow of fluid through the valve.

However, such known valves suffer from the drawback that they cause significant local energy dissipations when the obstructer is partially closed to adjust the flow of a fluid; such dissipations lead to a reduction in the mean velocity of the fluid, and hence a reduction in the flow rate or, the flow rate being equal, a variation in the pressure difference between the upstream side and the downstream side of the valve, but they typically do not offer any energetic advantage for the system in which the valve is included.

Moreover, such known valves, particularly when the obstructer is in a partially closed position for adjusting the flow of a fluid, cause sudden section variations along the path followed by the fluid, leading to local velocity increases and hence to sudden pressure drops that may cause undesirable and detrimental cavitation problems, which may prevent the valve from operating correctly.

A few energy recovering solutions do exist, which however apply to valve typologies which are different from the object of the present invention.

Some explanatory examples of energy recovering valves known in the art will now be mentioned, which allow recovering a part of the energy dissipated by the fluid.

Patent application WO2013121375 entitled "Energy recovering flow control valve" relates to a "ball" valve comprising a rotor inserted in a spherical obstructer.

Patent application WO2014132187 entitled "Control valve with energy recovery" relates to a control valve comprising an obstructer and a rotor positioned downstream of the obstructer. Such a control valve is of the type wherein the fluid follows a substantially axial path and the obstructer operates like a gate.

Compared with the present invention, such known energy recovering valves represent different solutions, in that they refer to different valve typologies, wherein the technical features relating to valve construction are also different.

OBJECTS AND SUMMARY OF THE INVENTION

It is one object of the present invention to provide a control valve for a fluid flow which is alternative to the prior art.

In particular, it is one object of the present invention to provide a control valve wherein it is possible to recover, at least partly, the energy of the fluid dissipated while adjusting the fluid flow through the valve.

It is another object of the present invention to provide a control valve that allows for a more accurate control of the fluid flow through the valve, in particular also when the obstructer is in a position of partial obstruction.

It is another object of the present invention to provide a control valve that allows controlling the fluid flow in an effective manner, without introducing any sudden variations in the velocity and pressure of the fluid that might give rise to cavitation problems.

It is a further object of the present invention to provide a control valve having a simple construction and compact dimensions, comparable to those of prior-art valves.

These and other objects of the present invention are achieved through a control valve incorporating the features set out in the appended claims, which are intended to be an integral part of the present description.

A general idea at the basis of the present invention is to provide a fluid flow control valve comprising: a valve body that defines an inlet and an outlet for a fluid, an obstructer inserted in the valve body, and an actuator system configured for reversibly translating the obstructer between a first position, in which it allows the passage of the fluid between the inlet and the outlet, and a second position, in which the obstructer prevents the passage of the fluid between the inlet and the outlet; the control valve further comprises a turbine rotor housed inside the valve body, wherein the rotor comprises a plurality of blades and is configured for continuously rotating, under the action of the fluid flowing between the inlet and the outlet, about an axis of rotation substantially aligned with the direction of translation of the obstructer.

The control valve according to the present invention, therefore, allows recovering at least a part of the energy dissipated by the fluid flowing through the valve; at the same time, the valve proves to be more effective in controlling the flow of a fluid through the valve itself, since it allows reducing the mean velocity of the fluid by a desired quantity by means of the rotor. The recovered energy will depend on the degree of opening of the obstructer, i.e., the fluid flow rate, and also on the efficiency of the rotor.

The control valve according to the present invention also allows an effective exploitation of the rotor for any position of the obstructer in which the fluid is allowed to flow through the valve itself, i.e., the optimal operation of the rotor is not only ensured within a subset of configurations taken by the obstructer while translating.

In particular, the presence of a rotor inside the valve allows varying the dissipations introduced in the fluid—thus adjusting the flow rate in a "fine" manner—even by only changing a resistant torque externally applicable to the rotor shaft.

Moreover, because the axis of rotation of the rotor is substantially aligned with the direction of translation of the obstructer, the effectiveness of the rotor and of the adjustment is improved: in fact, the path of the fluid inside the valve body is determined by the internal geometries of the valve itself, upon which the obstructer has a preponderant effect; since it rotates as summarized above, the rotor is positioned in a region of the valve body where the fluid-dynamic behaviour of the fluid flow is optimal.

Furthermore, in the embodiments of the present invention the introduction of a rotor in the valve body requires limited or even negligible modifications to the structure and principle of operation of the valve; therefore, compact control valves can be obtained, which are also easy to manufacture.

In addition, the presence of a rotor inside the valve body allows reducing local velocity peaks, thus reducing the risk of cavitation within the control valve.

Preferably, the present invention relates to a first control valve alternative, of the type referred to as "globe" valve. In such a control valve, the valve body internally comprises walls that delimit a fluid inlet chamber having a substantially circular seat, and the obstructer has a substantially disc-like shape and is configured for at least partially unrestricting a passage section at the circular seat when it is in the first open position, and is further configured for translating into the second closed position, so as to abut on the seat, in order to occlude the passage section.

Preferably, the present invention relates to a second control valve alternative, of the type referred to as "plunger" valve, with a cylindrical obstructer. In such a control valve, the valve body internally comprises an ovoid element which is fixed with respect to the sidewalls, and which internally houses the obstructer; the obstructer is shaped substantially like a cylinder, preferably comprising a plurality of slits, and is configured for at least partially unrestricting a passage section for the fluid downstream of the ovoid element in the first open position, and is further configured for translating into the second closed position, so as to occlude the passage section by means of the lateral wall of the cylinder, in particular by means of a portion of the lateral wall without any slits.

Further objects and advantages of the present invention will become more apparent from the following detailed description and from the dependent claims, which define some preferred and advantageous embodiments of the present invention.

BRIEF DESCRIPTION OF THE DRAWINGS

Some preferred and advantageous examples of embodiment of the present invention will now be described by way of non-limiting example with reference to the annexed drawings, wherein the same reference numerals are used to designate similar components, materials or functions, and wherein.

DETAILED DESCRIPTION OF THE INVENTION

Figure 1:
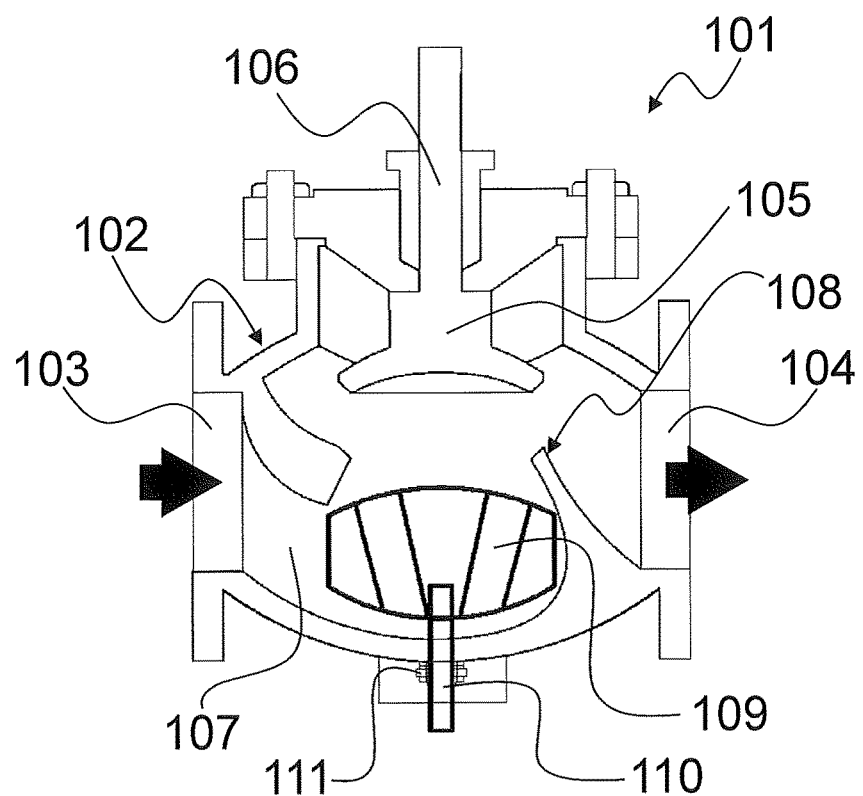
FIG. 1 shows a sectional side view of a first embodiment of a control valve according to the present invention, in the open configuration.

FIG. 1 shows a schematic view of an embodiment of the control valve 101, which is of the "globe" type.

The valve 101 comprises a body 102 having an inlet 103 and an outlet 104 that allow a fluid to flow through the valve 101 in the direction indicated by the thicker arrows.

The valve 101, in operational conditions, can be mounted to a pipe of a pressurized system.

The valve 101 further comprises a obstructer 105, inserted in the valve body 102, and an actuation stem 106, configured for reversibly translating the obstructer 105 within the valve body.

In the illustrated embodiment, the actuation stem 106 can be operated manually, e.g., by means of a screw-type mechanism and a knob (not shown); other solutions are nevertheless also possible, e.g., mechanical or pneumatic or hydraulic or electric or electromechanical ones, for the actuator system.

The obstructer 105 is configured for translating between a first position (see FIG. 1), in which the fluid is allowed to flow between the inlet 103 and the outlet 104, and a second position, in which said obstructer prevents the passage of the fluid (as will be described more in detail below with reference to FIG. 2).

In particular, the valve body 102 comprises an inlet chamber 107, the walls of which delimit a substantially circular seat 108, with which the obstructer 105 cooperates, as will be described below.

According to the present invention, a turbine rotor 109 is housed inside the valve body 102. Said rotor 109 comprises a plurality of blades, so that it can continuously rotate under the action of the fluid flowing through the valve 101.

In general, in the annexed drawings the rotor is represented by lines that are thicker than those used for representing the valve body.

In general, a control valve according to the present invention may comprise a rotor made in accordance with different manufacturing solutions and having different shapes, which essentially depend on the type of application of the valve itself. The embodiment of the rotor will primarily depend on the type of fluid for which the valve is to be optimized, whether gas, liquid, steam or any other multi-phase fluid. This diversification is also dependent on the specific type of liquid involved, e.g., the viscosity or density thereof. For example, the valve will need different characteristics to operate with oil rather than water, such as a higher flow coefficient, so as to obtain a higher flow rate; also, the rotor blades will require self-cleaning capability.

The turbine comprises, in addition to the rotor 109, a transmission shaft 110 to which the rotor 109 is constrained; the shaft 110 is driven by the torque produced by the rotor. Said shaft 110 is supported by rolling elements 111, such as bearings or other known systems, which allow the rotor 109 to rotate under the action of the fluid.

In general, particular attention must be paid to the making of the hole through the valve body, into which the shaft is to be inserted, because, while on the one hand a perfect seal is required in order to prevent any fluid leakage from the rolling elements, at the same time the sealing system must not hinder too much the rotation of the shaft by introducing excessive friction.

Therefore, the rotor 109 has an axis of rotation that is substantially aligned with the direction of the shaft 110.

In this embodiment, the transmission shaft 110 protrudes from the valve body 102 in order to be connected to an external utilizer (not shown). Preferably, the protruding end of the shaft 110 is mechanically connected to a utilizer that will use the mechanical power provided by the shaft due to the rotation of the rotor; the utilizer may be, therefore, an electric generator or a mechanical utilizer, e.g., a fan.

In other embodiments, the mechanical transmission may further comprise clutches or gear reducers of known types, not shown herein for simplicity, which will allow obtaining a predetermined advantageous transmission ratio according to the power recoverable from the fluid and to the resistance characteristics of the associated utilizer to be supplied.

As clearly shown in the drawings, the axis of rotation of the rotor 109 is substantially aligned with the direction of translation of the obstructer 106.

In particular, the axis of rotation of the rotor 109 is substantially aligned with the axis along which the actuation stem 106 can slide, in the same direction as the direction of translation of the obstructer 106.

In this manner, the turbine rotor 109 inserted in the control valve 101 will have its axis of rotation aligned with the direction of motion of the actuator 106 and of the obstructer 105, and the internal shape of the valve body 102 will allow reducing the dimensions of the valve and increasing the efficiency of the turbine.

In the embodiment of the valve 101, the turbine is mechanically disconnected from the actuator; other solutions wherein the turbine is mechanically connected to the actuator and/or to the obstructer are nevertheless also possible, as will become apparent below.

The dimensions of the rotor 109 are such as to occupy substantially the entire passage section at the seat 108, preferably because of its convex shape matching the geometries of the chamber 107.

In this case, the rotor 109 is configured for a perimetrical inflow of the fluid and for an axial outflow of the fluid, which will then cross the seat 108. In fact, the rotor 109 is located in the inlet chamber 107.

In particular, in the solution of the control valve 101 there is the advantage that the valve closing mechanism does not need to be deeply modified, since the rotor is upstream of the obstructer, in a region that is not involved in the translation of the latter. Furthermore, the shaft 110 is coaxial, or at least substantially coaxial, to the direction of translation of the obstructer 105, so that the obstructer 105 can translate in order to close the valve without impairing the operation of the rotor 109.

Figure 2:
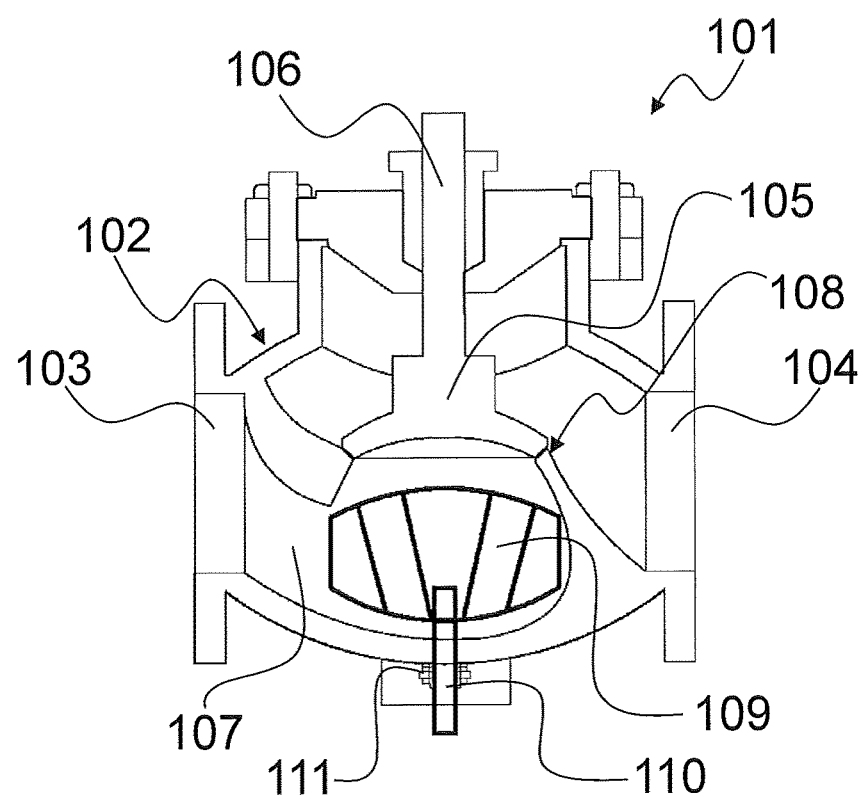
FIG. 2 shows the same sectional side view of the control valve of FIG. 1, in the closed configuration.

FIG. 2 shows the control valve 101 in the closed configuration, i.e., with the obstructer 105 in contact with the seat 108.

Under the action of the actuator system 106, the obstructer 105 is brought into the second position to prevent the fluid from flowing through the valve 101.

In particular, the obstructer 105 has a substantially disc-like shape, and is configured for translating towards and abutting on the circular seat 108 in order to occlude the fluid passage section.

The coupling between the seat 108 and the obstructer 105 is such as to ensure fluid tightness when the obstructer is in the second (closed) position; tightness can be ensured for a specific fluid, whether it is a liquid, gas, steam or any other multi-phase fluid; to ensure such tightness, known elements and techniques can be used.

If, from the position of FIG. 2, the obstructer 105 is raised again by the actuator system 106 as shown in FIG. 1, the passage section will become again partially open at the seat 108, thus allowing the fluid to flow through the valve 101.

In the second position shown in FIG. 2, the fluid cannot flow around the rotor 109; therefore, the rotor 109 will remain still and no mechanical power will be generated by the shaft 110.

In this configuration, although no energy will be recovered, the valve 101 will allow closing the duct, thus effectively performing this task much like prior-art control valves.

In this regard, the presence of the rotor 111 does not in the least affect the outer dimensions or function of the valve 101.

In general, it must be pointed out that a valve according to the present invention can be obtained by conversion of a known valve, by adding thereto components such as the rotor and the shaft after appropriate mechanical machining.

In particular, the embodiment of the valve 101 is particularly advantageous for converting a traditional globe valve, since the rotor 109 can be freely inserted into the chamber 107.

Figure 3:
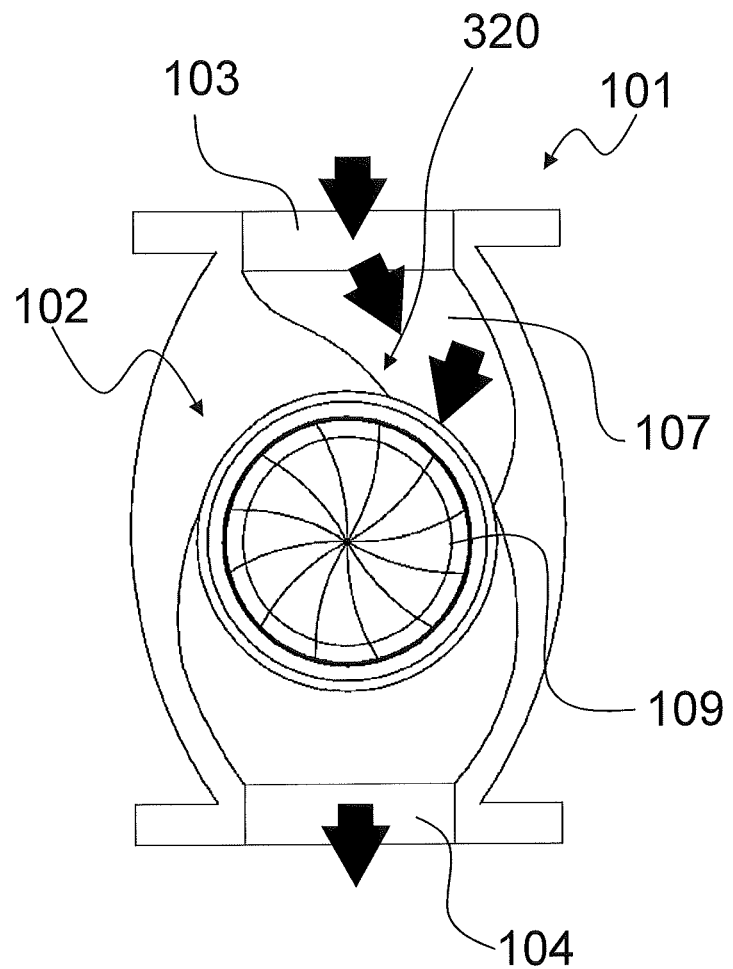
FIG. 3 shows a sectional top view of the control valve of FIG. 1 and of the rotor thereof.

FIG. 3 shows a sectional top view of the control valve 101 and of the rotor 109 thereof.

Near the inlet 103, the valve 101 comprises a diverting element, or flow diverter 320, located upstream of the rotor 109 relative to the direction of the fluid flow.

The flow diverter 320 improves the efficiency of the rotor 109 by directing and concentrating the fluid flow towards the blades of the rotor 109, which will thus undergo a stronger thrust. The flow diverter 320 may be a simple plate anchored and welded to a support, or it may have more aero-fluid-dynamically efficient shapes, as exemplified in FIG. 3, to avoid vein breaking.

Preferably, the flow diverter 320 is arranged asymmetrically in the inlet section 103 of the valve 101.

The flow diverter 320 also allows the rotor 109 to be more easily set in motion when the valve 101 is opened partially, by asymmetrically directing the fluid towards some blades of the rotor, thereby facilitating the starting thereof.

Figure 4:
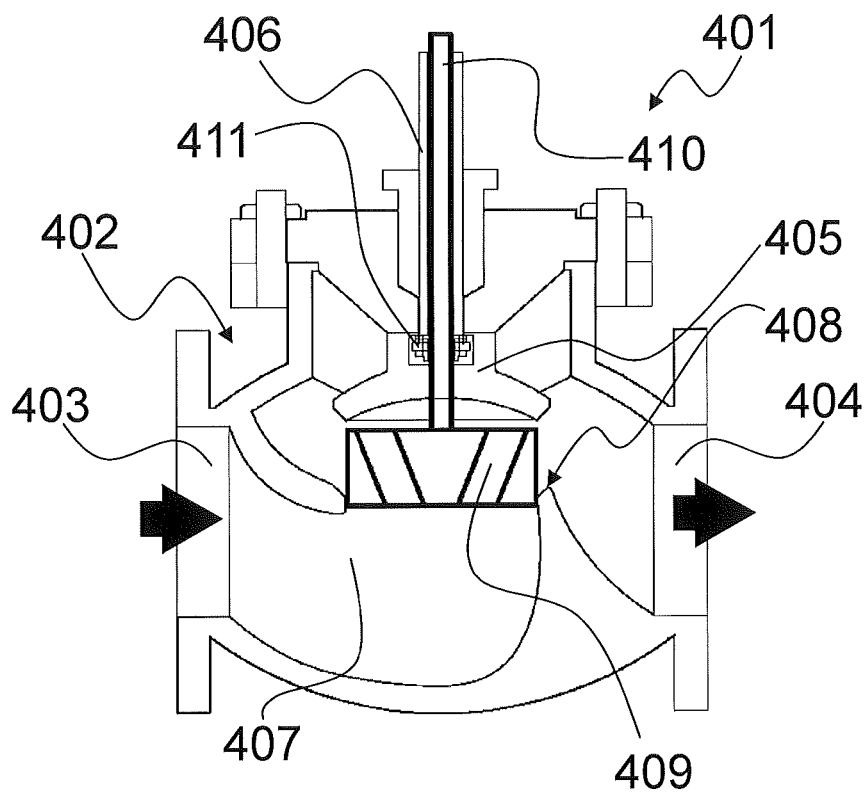
FIG. 4 shows a sectional side view of a second embodiment of a control valve according to the present invention, in the open configuration.

FIG. 4 shows a schematic view of an embodiment of the control valve 401, which is of the "globe" type.

The valve 401 comprises a valve body 402 that defines an inlet 403 and an outlet 404 similar to those of the valve 101. The valve 401 comprises a substantially spherical obstructer 405, similar to that of the valve 101.

In particular, the obstructer 105 is configured for translating between a first position (see FIG. 4), in which the fluid is allowed to flow between the inlet 403 and the outlet 404, and a second position, in which said obstructer prevents the passage of the fluid (as will be described more in detail below with reference to FIG. 5).

The valve body 402 comprises an inlet chamber 407, the walls of which delimit a substantially circular seat 408, with which the obstructer 405 cooperates.

In this embodiment, the actuation stem 406 is internally hollow to allow the passage of the shaft 410, which is connected to the rotor 409 housed inside the valve body 402.

Said rotor 409 comprises a plurality of blades, so that it can continuously rotate under the action of the fluid flowing through the valve 401.

In addition to the rotor 409 and the transmission shaft 410, the turbine comprises rolling elements 411 allowing the rotor 409 to rotate under the action of the fluid.

Therefore, also the rotor 409 has an axis that is exactly aligned with the direction of the shaft 410. Moreover, the axis of rotation of the rotor 409 is substantially aligned with the direction of translation of the obstructer 406.

In this embodiment, the transmission shaft 410 protrudes from the valve body 402 to be connected to an external utilizer (not shown), which makes use of its mechanical power.

The turbine 409 is inserted in such a way that it can translate integrally with the actuator 405, as will become more apparent below. In fact, the rotor 409 is configured for translating through the seat 408, jointly with the obstructer 408. Thus, all mobile parts of the valve 401 are connected to one another, resulting in simpler manufacturing and maintenance. It is clear, in fact, that the obstructer 408 and the rotor 409 can be removed by disassembling the valve 401 in a single step.

The dimensions of the rotor 409 are such that it substantially occupies the entire passage section at the seat 408, thus providing an axial inflow of the fluid from the chamber 407 and a perimetrical outflow of the fluid downstream of the seat 408.

Figure 5:
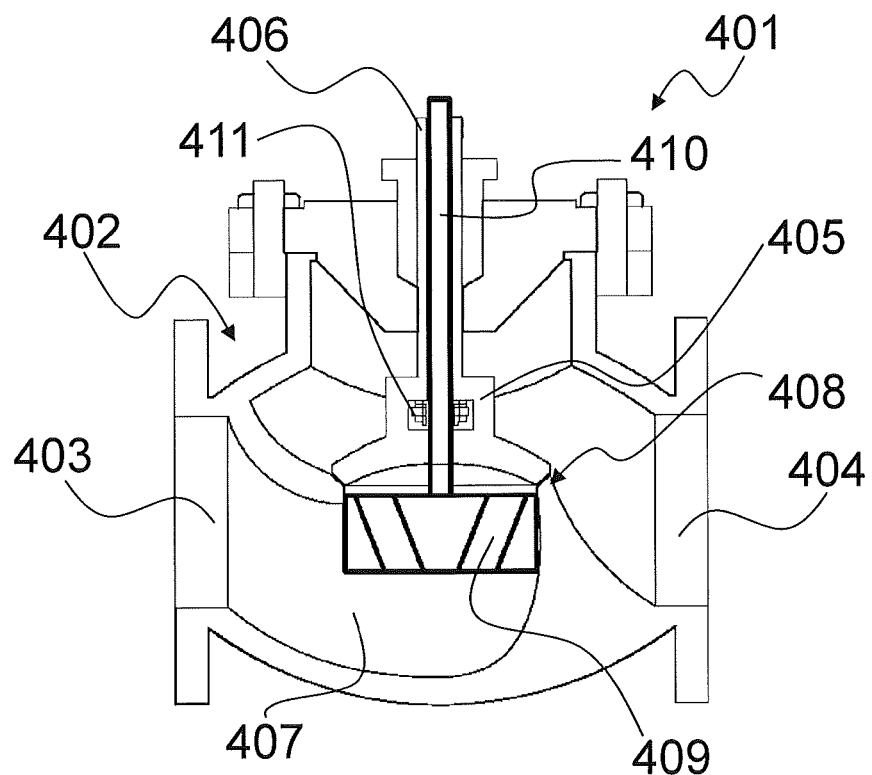
FIG. 5 shows the same sectional side view of the control valve of FIG. 4, in the closed configuration.

FIG. 5 shows the control valve 401 in the closed configuration, i.e., with the obstructer 405 in contact with the seat 408.

Under the action of the actuator system 406, the obstructer 405 is brought into the second position to prevent the fluid from flowing through the valve 401 in much the same way as previously described with reference to the valve 101.

In this case as well, it must be underlined that the presence of the rotor 409 does not in the least affect the outer dimensions or function of the valve 401.

In particular, the embodiment of the valve 401 is particularly advantageous in terms of efficiency, since the rotor 409 is located exactly in the section where passage of fluid occurs.

Figure 6:
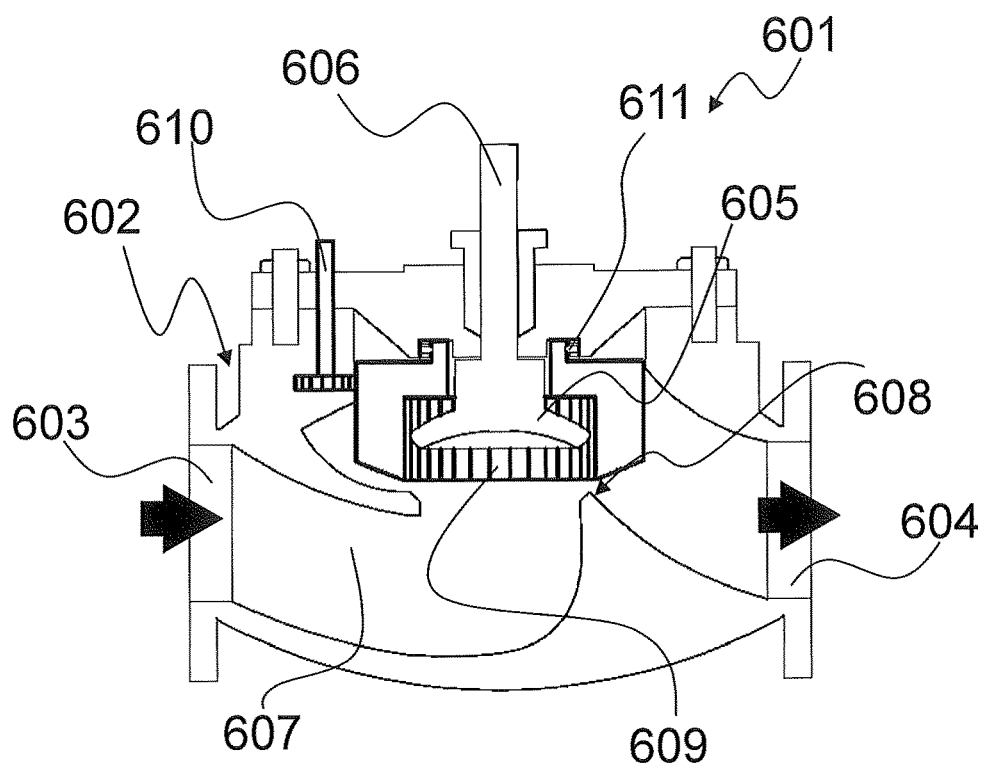
FIG. 6 shows a sectional side view of a third embodiment of a control valve according to the present invention, in the open configuration.

FIG. 6 shows a schematic view of an embodiment of the control valve 601, which is of the "globe" type.

The valve 601 comprises a body 602 having an inlet 603 and an outlet 604 similar to those of the valve 101.

The valve 601 further comprises a obstructer 605, inserted in the valve body 602, and an actuation stem 606, configured for reversibly translating the obstructer 605 within the valve body 602. Such elements are substantially similar to those of the valve 101.

The obstructer 605 is configured for translating between a first position (see FIG. 6), in which the fluid is allowed to flow between the inlet 603 and the outlet 604, and a second position, in which said obstructer prevents the passage of the fluid (as will be described more in detail below with reference to FIG. 7).

The valve body 602 comprises an inlet chamber 607, which delimits a seat 608, with which the obstructer 605 cooperates.

The valve body 602 houses a rotor 609, which comprises a plurality of blades, so that it can continuously rotate under the action of the fluid flowing through the valve 601.

The rotor 609 is connected to a mechanical gear transmission, in turn connected to the output shaft 610, which allows defining a predetermined and advantageous transmission ratio. The rotor 609 is mounted on rolling elements 611, which support it and allow it to rotate under the action of the fluid.

The output shaft 610 protrudes from the valve body 602 to be connected to an external utilizer, which makes use of its mechanical power.

As can be appreciated in the drawings, the axis of rotation of the rotor 609 is substantially aligned with the direction of translation of the obstructer 606, which is given by the actuator system 606.

In particular, the axis of rotation of the rotor 609 is substantially aligned with the axis along which the actuation stem 606 can slide, in the same direction as the direction of translation of the obstructer 606.

In order to allow the valve 601 to open in the first position shown in FIG. 6, the rotor 609 is configured for allowing the obstructer 605 to be at least partially housed therein. In this manner, the obstructer 605 will be allowed to translate in order to open the valve.

In the solution of the valve 601, the turbine is inserted separately from the obstructer, which must be accommodated inside the turbine when the valve is open; a particularly compact valve can thus be obtained.

The dimensions of the rotor 609 are such that it substantially occupies the entire passage section at the seat 608, thus providing an axial inflow of the fluid from the chamber 607 and a perimetrical outflow of the fluid downstream of the seat 608.

In the solution of the valve 601, the turbine may be fully independent, or it may be connected for the sole purpose of improving the stability of the turbine itself. This choice can be made as a function of the dimensions of the valve 601 and of the operating conditions, which may be more or less heavy.

Figure 7:
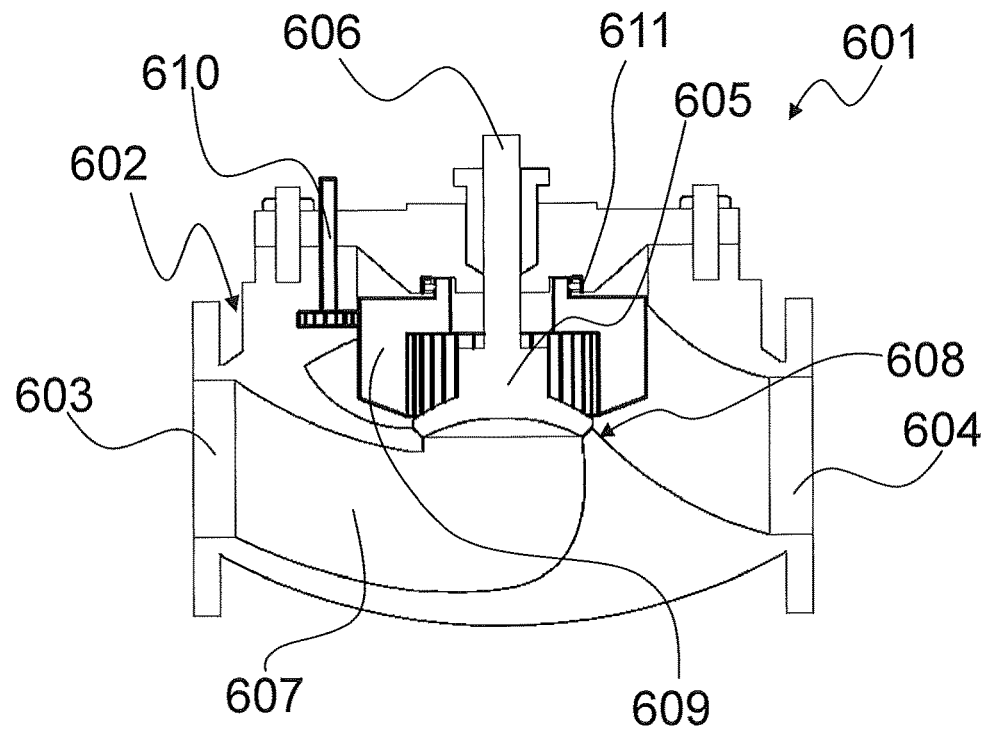
FIG. 7 shows the same sectional side view of the control valve of FIG. 6, in the closed configuration.

FIG. 7 shows the control valve 601 in the closed configuration, i.e., with the obstructer in contact with the seat.

Under the action of the actuator system 606, the obstructer 605 is brought into the second position to prevent the fluid from flowing through the valve 601, as previously described.

In this case as well, it must be underlined that the presence of the rotor does not in the least affect the outer dimensions or function of the valve 601.

In particular, the embodiment of the valve 601 is particularly advantageous in terms of efficiency, since the rotor 609 is located exactly in the section where passage of fluid occurs.

Figure 8:
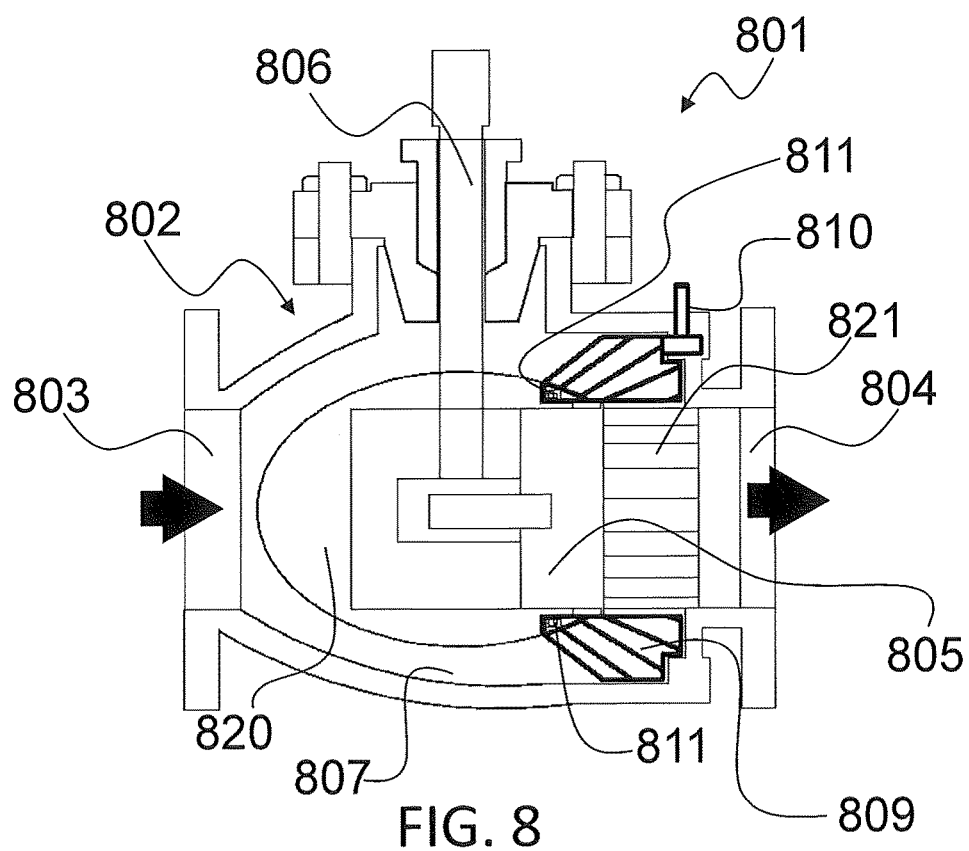
FIG. 8 shows a sectional side view of a fourth embodiment of a control valve according to the present invention, in the open configuration.

FIG. 8 shows a schematic view of an embodiment of the control valve 801, which is of the "plunger" type.

The valve 801 comprises a body 802 having an inlet 803 and an outlet 804 that allow a fluid to flow through the valve 801 in the direction indicated by the thicker arrows.

The valve 801, in operational conditions, can be mounted to a pipe of a pressurized system.

The valve 801 comprises an ovoid element 820, which is inserted in the valve body 802 and is fixed relative to the walls of the valve body. Said ovoid element 820 gives the valve 802 the above-mentioned "plunger" configuration.

In the valve 801, the ovoid element 820 internally houses the obstructer 805. The position of the obstructer 805 is controlled by means of an actuator system 806 configured for reversibly translating the obstructer 805 within the valve body 802.

In the illustrated embodiment, the actuator system 806 can be operated manually, e.g., by means of a screw-type mechanism and a knob (not shown); other solutions are nevertheless also possible, e.g., mechanical or hydraulic or pneumatic or electric or electromechanical ones, for the actuator system.

The obstructer 805 and the actuator system 806 can be made, as far as the other construction details (not described herein) are concerned, in accordance with prior-art solutions.

The obstructer 805 is shaped substantially like a cylinder, and preferably comprises a plurality of slits 821 through which the fluid can flow in the position shown in FIG. 8.

In fact, the fluid enters the inlet chamber 807 around the ovoid element 820 and flows through the valve 806 without being hindered by the obstructer 805, which is in the open position, in particular by flowing through the slits 821.

In fact, in the first position shown in FIG. 8 the obstructer 805 clears a passage section downstream of the ovoid element.

The obstructer 805 is configured for translating into a second position, in which the fluid is prevented to flow (as will be described in more detail with reference to FIG. 9).

The rotor 809 comprises a plurality of blades, configured for continuously rotating under the action of the fluid flowing through the valve 801.

The rotor 809 is so shaped as to be configured for coupling to the ovoid element 820. The dimensions of the rotor 809 are such that it substantially occupies the entire free section around the ovoid element 820.

The rotor 809 is configured for an axial inflow of the fluid, in particular downstream of the ovoid element 820, and for an axial outflow of the fluid, considering the overall geometry of the rotor 809, through the slits 821, on the right-hand side of the rotor 809.

In particular, the rotor 809 is configured for a converging outflow of the fluid for entering the outlet 804.

For this purpose, the rotor 809 comprises a central hole configured for allowing the obstructer 805 to be housed therein, in both the first position of FIG. 8 and the second position, which will be described more in detail below with reference to FIG. 9.

The turbine comprises, in addition to the rotor 809, a transmission shaft 810 to which the rotor 809 is connected by means of a gear system; the shaft is driven by the torque produced by the rotor. The rotor 811 is supported by rolling elements 811, such as bearings or other known systems, which allow the rotor 809 to rotate under the action of the fluid.

In this embodiment, the transmission shaft 810 protrudes from the valve body 802 to be connected to an external utilizer.

In general, the turbine is constrained by means of bearings or other mechanical solutions which might be more appropriate depending on its dimensions, and transmits the rotary motion to the outside by means of a suitable gear system or magnetic drive joints.

Preferably, the protruding end of the shaft 810 is mechanically connected to a utilizer that will use the mechanical power provided by the shaft due to the rotation of the rotor.

As clearly shown in the drawings, the axis of rotation of the rotor 809 is substantially aligned with the direction of translation of the obstructer 805.

In particular, the axis of rotation of the rotor 809 is substantially aligned with the sliding axis of the cylindrical element, inside the ovoid element 820.

In this manner, the turbine rotor inserted in the control valve will have its axis of rotation aligned with the direction of motion of the obstructer 805, and the internal shape of the valve body 802 will allow reducing the dimensions of the valve and increasing the efficiency of the turbine.

In alternative embodiments, suitable flow diverters (not shown) may be positioned upstream of the obstructer 805 and of the rotor 809 in order to trigger the rotary motion and increase the efficiency of the turbine. Being channelled at the sides of the obstructer drive system as in a normal plunger valve, the flow meets the turbine before meeting the obstructer. Also, the slits 821 of the obstructer 805 may have an appropriate angle of incidence in order to facilitate the outflow of the fluid from the blades of the rotor 809.

Figure 9:
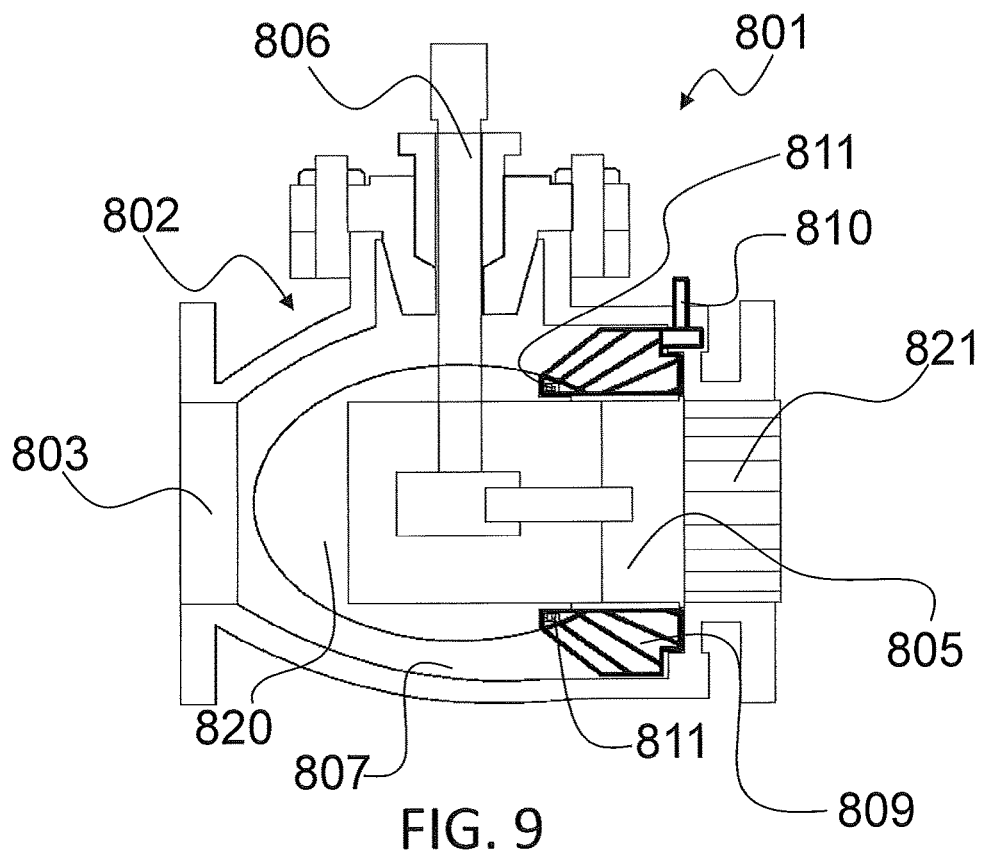
FIG. 9 shows the same sectional side view of the control valve of FIG. 8, in the closed configuration.

FIG. 9 shows the control valve 801 in the closed configuration, i.e., with the obstructer 805 translated into a second position. In this second position, the obstructer 805 is configured for obstructing the passage section by means of a lateral wall of the cylinder 805, which has no slits 821. In this configuration, the obstructer prevents the fluid from flowing through the valve 801.

When the actuator system 806 is operated, the obstructer 805 will move to the left to clear the valve, thus causing the passage section of the slits 821 to match the free section.

Figure 10:
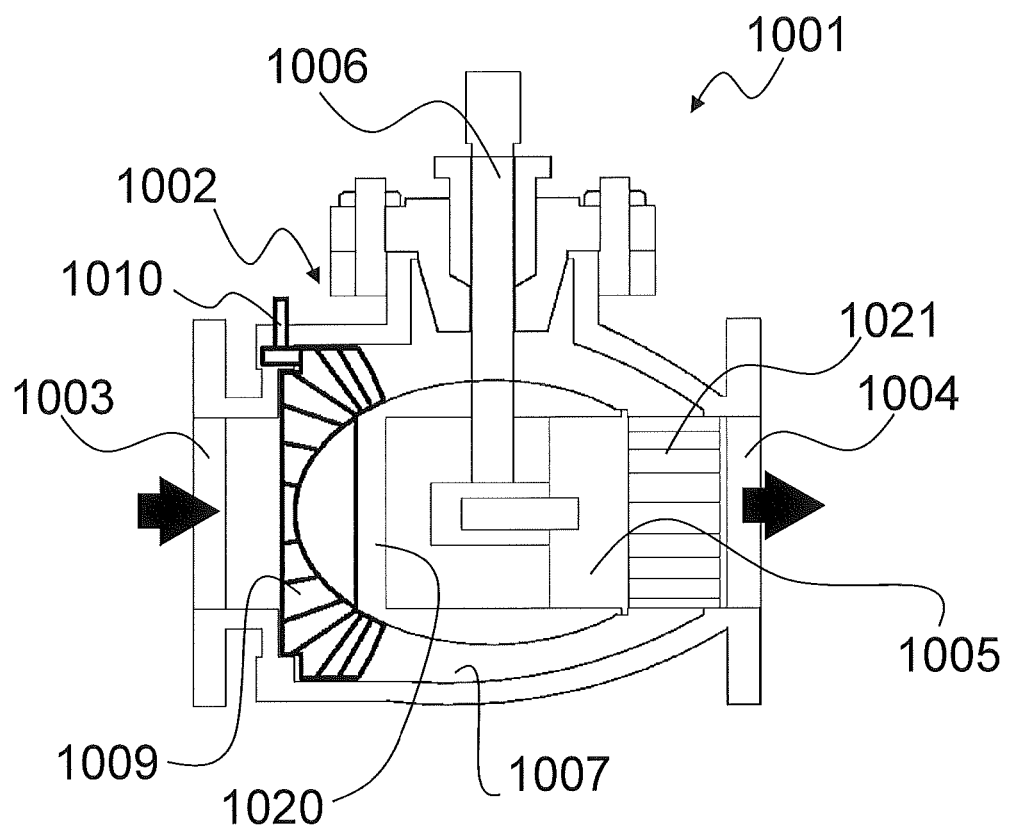
FIG. 10 shows a sectional side view of a fifth embodiment of a control valve according to the present invention, in the open configuration.

FIG. 10 shows a schematic view of an embodiment of the control valve 1001, which is of the "plunger" type.

The valve 1001 comprises a body 1002 having an inlet 1003 and an outlet 1004 similar to those already described.

The valve 1001 further comprises an ovoid element 1020 similar to the one already described with reference to the valve 801.

Also in the valve 1001, the ovoid element 1020 internally houses the obstructer 1005, the position of which is controlled by means of an actuator system 1006 similar to the system 806.

The obstructer 1005 is shaped substantially like a cylinder, and preferably comprises a plurality of slits 1021 through which the fluid can flow in the position shown in FIG. 10, similarly to the valve 801.

The rotor 1009 comprises a plurality of blades, configured for continuously rotating under the action of the fluid flowing through the valve 1001.

In particular, the rotor 1009 is located upstream of the ovoid element 1020, with respect to the direction of the fluid flow in the chamber 1007.

The rotor 1009 is so shaped as to be configured for coupling to the ovoid element 1020. The dimensions of the rotor 1009 are such that it substantially occupies the entire free section around the ovoid element 1020.

The rotor 1009 is configured for an axial inflow of the fluid, in particular upstream of the ovoid element 1020, and for an axial outflow of the fluid, in particular, considering the overall geometry of the rotor 1009, for a diverging axial outflow around the ovoid element 1020 in the cavity 1007.

In particular, the rotor 1009 is configured for a diverging outflow of the fluid around the ovoid element 1020.

In addition to the rotor 1009, the turbine comprises a transmission shaft 1010 to which the rotor 1009 is connected by means of a gear system, which is substantially similar to the transmission shaft 810, though in a different position.

As clearly shown in the drawings, the axis of rotation of the rotor 1009 is substantially aligned with the direction of translation of the obstructer 1005.

In particular, the axis of rotation of the rotor 1009 is substantially aligned with the sliding axis of the cylindrical element, inside the ovoid element 1020.

In this manner, the turbine rotor inserted in the control valve will have its axis of rotation aligned with the direction of motion of the obstructer 1005, and the internal shape of the valve body 1002 will allow reducing the dimensions of the valve and increasing the efficiency of the turbine.

In particular, in the solution of the control valve 1001 there is the advantage that the valve closing mechanism does not need to be deeply modified, since the rotor is inserted upstream of the ovoid element 1020, in a region that is not involved in the translation of the obstructer 1005.

Figure 11:
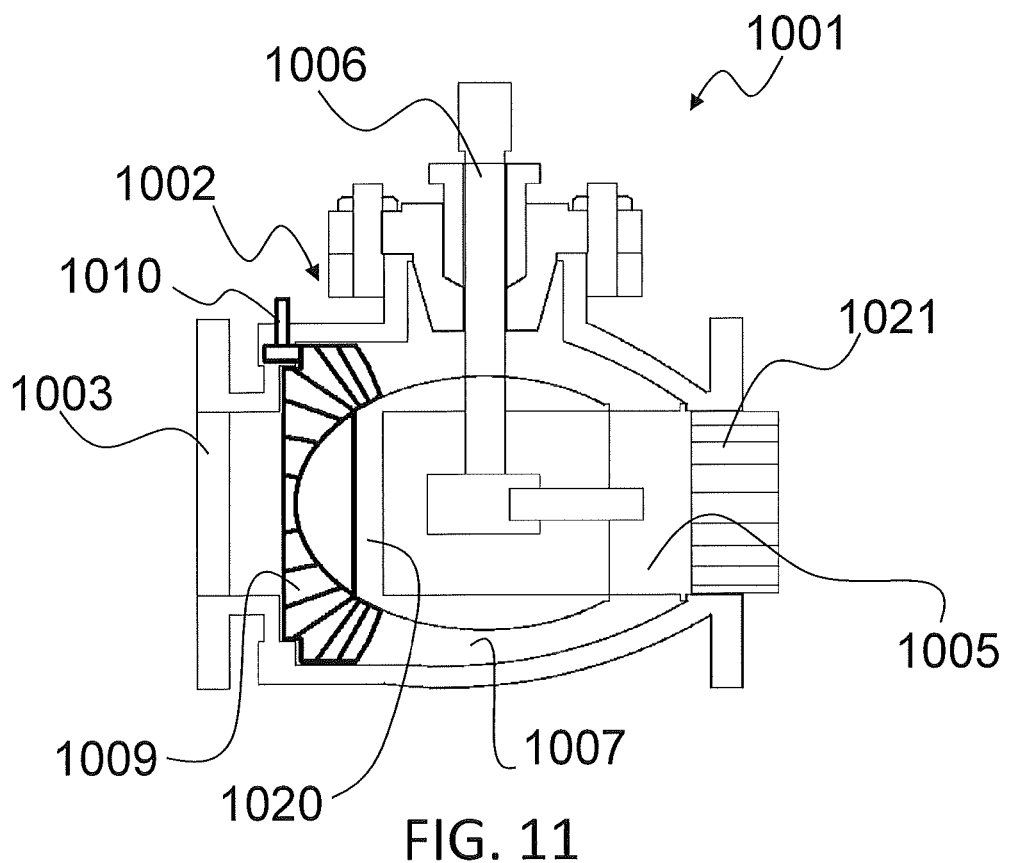
FIG. 11 shows the same sectional side view of the control valve of FIG. 10, in the closed configuration.

FIG. 11 shows the control valve 1001 in the closed configuration, i.e., with the obstructer 1005 translated into a second position. In this second position, the obstructer 1005 is configured for obstructing the passage section by means of a lateral wall of the cylinder 1005, which has no slits 1021. In this configuration, the obstructer prevents the fluid from flowing through the valve 1001.

When the actuator system 1006 is operated, the obstructer 1005 will move to the left to clear the valve, thus causing the passage section of the slits 1021 to match the free section.

In general, in the place of the previously described mechanical transmission for connection to the external utilizer, a magnetic drive system may be used for transferring the motion of the rotor outside the valve body. It will thus be possible to exploit the rotation of the rotor while limiting the energy dissipations due to mechanical couplings and ensuring hydraulic tightness of the valve; this alternative solution can also be advantageously employed in particularly heavy conditions, taking into consideration the nature of the fluid that needs to be controlled (inflammable liquids or gases, or control devices for drinking water or fluids that must not be contaminated).

INDUSTRIAL APPLICABILITY

The present solution allows making a control valve that offers numerous advantages.

This control valve allows recovering a part of the energy dissipated during the processes for controlling pressurized fluids.

By using valves in accordance with the present invention, it will be possible to create stand-alone valves for off-grid applications, i.e., applications wherein power is not supplied by an electric grid, but by the energy recovered from the control process itself.

It is clear that, in the light of the present description, the man skilled in the art will be able to conceive many variants still falling within the protection scope set out in the appended claims.

For example, one may conceive rotor variants essentially differing from one another in the number and shape of the blades, the features of which will be established according to known engineering techniques. In fact, diversified rotor variants can be conceived for a valve according to the present invention, depending on whether it will mostly have to work fully or partially open, with compressible or incompressible fluids.

It will also be possible, for example, to optimize the shape and construction of the various elements of the valve according to the prevailing operating conditions of the valve itself.

As far as construction materials are concerned, the criteria of good engineering practice shall be adopted, by using known metal alloys typically employed for common control valves, and by taking into account the operating pressures and temperatures involved, the aggressiveness of the working environment, and the corrosiveness of the fluid.

The invention claimed is:

1. A control valve for a fluid flow, comprising:
a valve body that defines an inlet and an outlet for said fluid, an obstructer inserted in said valve body;
an actuator system configured for reversibly translating said obstructer between a first position, in which said obstructer allows the passage of said fluid between said inlet and said outlet;
a second position, in which said obstructer prevents the passage of said fluid between said inlet and said outlet, wherein the control valve further comprises a turbine rotor housed inside said valve body, wherein said rotor comprises a plurality of blades and is configured for continuously rotating under the action of said fluid flowing between said inlet and said outlet;
said rotor rotating about an axis of rotation substantially aligned with the direction of translation of said obstructer;
wherein said valve body internally comprises walls which delimit a fluid inlet chamber having a substantially circular seat, and wherein said obstructer is substantially disc-like shaped, and wherein said obstructer is configured for at least partially unrestricting a passage section at said seat in said first position, and wherein said obstructer is further configured for translating into said second position, so as to abut on said seat, in order to occlude said passage section; and
wherein said rotor is so sized as to substantially engage the whole said passage section at said seat, and wherein said rotor is configured for an axial inflow of said fluid into it, and for a perimetrical outflow of said fluid from said rotor; and
wherein said rotor is configured for allowing at least a partial accommodation of said obstructer inside of it, so as to allow translation of said obstructor into said first position.

2. The control valve according to claim 1, wherein said rotor is further configured for jointly translating with said obstructer, passing through said seat.

3. The control valve according to claim 1, wherein said rotor is so sized as to substantially engage the whole said passage section at said seat, and wherein said rotor is configured for a perimetrical inflow of said fluid into it, and for an axial outflow of said fluid from said rotor, said rotor being positioned in said fluid inlet chamber.

4. The control valve according to claim 3, wherein said valve body comprises, proximal to said inlet, a flow diverter configured for directing said fluid flow asymmetrically onto the perimeter of said rotor, so as to trigger the rotation of said rotor.

5. The control valve according to claim 1, wherein said valve body internally comprises an ovoid element which is fixed with respect to the sidewalls of said valve body, wherein said ovoid element internally houses said obstructer, wherein said obstructer is shaped substantially like a cylinder, and wherein said obstructer is configured for at least partially unrestricting a passage section for said fluid downstream of said ovoid element in said first position, and wherein said obstructer is further configured for translating into said second position, so as to occlude said passage section by means of the lateral wall of said cylinder, in particular by means of a portion of said lateral wall without said slits.

6. The control valve according to claim 5, wherein said rotor is so shaped as to mate with said ovoid element, and is so sized as to occupy substantially the whole free section around said ovoid element, and wherein said rotor is configured for an axial inflow of said fluid into it, and for an axial outflow of said fluid from said rotor.

7. The control valve according to claim 6, wherein said rotor is located upstream of said ovoid element with respect to the direction of said fluid between said inlet and said outlet, and wherein said outflow from said rotor is diverging around said ovoid element.

8. The control valve according to claim 6, wherein said rotor is located downstream of said ovoid element with respect to the direction of said fluid between said inlet and said outlet, and wherein said outflow from said rotor is converging for entering said outlet.

9. The control valve according to claim 8, wherein said rotor comprises a central hole configured for allowing said obstructer to be housed therein, in both said first position and said second position.

10. The control valve according to claim 5, wherein said obstructer comprises a plurality of slits.

11. The control valve according to claim 1, wherein said turbine comprises said rotor, wherein said rotor is supported by rolling elements allowing it to rotate about said axis of rotation, and wherein said turbine further comprises a transmission adapted to rotate a shaft protruding from said valve body and configured for being connected to an external mechanical or electric utilizer.

12. The control valve according to claim 11, wherein said transmission is a mechanical transmission.

13. The control valve according to claim 12, wherein said mechanical transmission comprises a gear transmission having a predefined transmission ratio.

14. The control valve according to claim 11, wherein said transmission is a magnetic drive transmission.

15. A control valve for a fluid flow, comprising:
a valve body that defines an inlet and an outlet for said fluid, an obstructer inserted in said valve body;
an actuator system configured for reversibly translating said obstructer between a first position, in which said obstructer allows the passage of said fluid between said inlet and said outlet;
a second position, in which said obstructer prevents the passage of said fluid between said inlet and said outlet, wherein the control valve further comprises a turbine rotor housed inside said valve body, wherein said rotor comprises a plurality of blades and is configured for continuously rotating under the action of said fluid flowing between said inlet and said outlet;
said rotor rotating about an axis of rotation substantially aligned with the direction of translation of said obstructer;
wherein said valve body internally comprises an ovoid element which is fixed with respect to the sidewalls of said valve body, wherein said ovoid element internally houses said obstructer, wherein said obstructer is shaped substantially like a cylinder, and wherein said obstructer is configured for at least partially unrestricting a passage section for said fluid downstream of said ovoid element in said first position, and wherein said obstructer is further configured for translating into said second position, so as to occlude said passage section by means of the lateral wall of said cylinder, in particular by means of a portion of said lateral wall without said slits.

16. A control valve for a fluid flow, comprising:
a valve body that defines an inlet and an outlet for said fluid, an obstructer inserted in said valve body;
an actuator system configured for reversibly translating said obstructer between a first position, in which said obstructer allows the passage of said fluid between said inlet and said outlet;
a second position, in which said obstructer prevents the passage of said fluid between said inlet and said outlet, wherein the control valve further comprises a turbine rotor housed inside said valve body, wherein said rotor comprises a plurality of blades and is configured for continuously rotating under the action of said fluid flowing between said inlet and said outlet;
said rotor rotating about an axis of rotation substantially aligned with the direction of translation of said obstructer;
wherein said turbine comprises said rotor, wherein said rotor is supported by rolling elements allowing it to rotate about said axis of rotation, and wherein said turbine further comprises a transmission adapted to rotate a shaft protruding from said valve body and configured for being connected to an external mechanical or electric utilizer;
wherein said transmission comprises:
a mechanical transmission comprising a gear transmission having a predefined transmission ratio; or
a magnetic drive transmission.

* * * * *